United States Patent [19]

Brakarz et al.

[11] Patent Number: 5,323,933
[45] Date of Patent: Jun. 28, 1994

[54] ATOMIZER MICORPUMP FOR LIQUIDS

[76] Inventors: Jack Brakarz, Av. Epitacio Pessoa, 300 Apt° 301; Felix A. Camhi, Av. Epitacio Pessoa, 300 Apt° 401, both of Rio de Janeiro, RJ, Brazil

[21] Appl. No.: 25,185

[22] Filed: Mar. 2, 1993

[30] Foreign Application Priority Data

Mar. 30, 1992 [BR] Brazil .................................. 9201113

[51] Int. Cl.⁵ .......................................... G01F 11/30
[52] U.S. Cl. .................................................. 222/321
[58] Field of Search ................ 222/321, 385, 383, 341

[56] References Cited

U.S. PATENT DOCUMENTS

| | | | |
|---|---|---|---|
| 4,173,297 | 11/1979 | Pettersen | 222/321 |
| 4,930,999 | 6/1990 | Brunet et al. | 222/321 |
| 4,964,547 | 10/1990 | Lina | 222/321 |
| 5,020,696 | 6/1991 | Cater | 222/385 X |
| 5,046,644 | 9/1991 | Cater | 222/385 X |
| 5,083,682 | 1/1992 | Cater | 222/341 |
| 5,096,097 | 3/1992 | Lina | 222/321 X |
| 5,105,994 | 4/1992 | Jouillat et al. | 222/321 |
| 5,108,013 | 4/1992 | Van Brocklin | 222/321 |
| 5,163,588 | 11/1992 | Cater | 222/385 X |
| 5,176,296 | 1/1993 | Lina et al. | 222/321 |
| 5,190,192 | 3/1993 | Lina et al. | 222/321 |
| 5,217,148 | 6/1993 | Cater | 222/321 |

Primary Examiner—Kevin P. Shaver
Attorney, Agent, or Firm—Ladas & Parry

[57] ABSTRACT

A manually-operable liquid atomizer micropump for spraying liquid contained in a bottle or other receptacle. The subassembly of the pump is formed by a collar which can be fitted in any one of a plurality of bottle covers. The collar is fitted in a cylindrically-shaped body having several diameters and forming an internal skirt and a lower extension for receiving a dip tube. The cylindrically-shaped body houses a helical spring supported by an internal contour of the body and by a step in a valve having a cylindrical lower portion and an upper portion received in the bore of a piston. The spring biases the valve against the bore. The piston and body bound a chamber whose volume can be varied by telescopic movement of the valve in relation to the body. The cylindrical lower portion of the valve cooperates with the cylinder body to control the intake of fluids into the chamber. Liquid in the chamber can be compressed to generate pressure to overcome the bias of the spring, opening the bore of the piston and permitting escape of liquid under pressure through the bore and into ambient atmosphere.

7 Claims, 5 Drawing Sheets

ATOMIZER MICORPUMP FOR LIQUIDS

The present invention concerns improvements in the operation of a liquid atomizer micropump to be mounted as a cap on screw-on flasks or bottles, as well as by crimping for dispensing liquids under pressure so as to avoid the use of propellant gases or aerosols.

Various pump constructions have been proposed for the same purpose some of which have been commercially employed. The most relevant references to the present invention are U.S. Pat. Nos. 224,827, 882,321, 3,399,836, 3,627,206, 3,746,260, 779,464, 3,923,250, 3,954,354, 4,017,031, 4,025,046, 4,051,983, 4,173,297, 4,530,449, 4,606,478, BR PI 7603960, BR PI 7808197 and BR PI 8501392. The Applicants themselves have developed micropumps (see patents BR PI 7603960 and BR PI 8501392) which atomize liquids through manual operation and which are freed from using propellants and the like, by means of an assembly of components contained in a cylinder, so as to form an expansible chamber which is compressed by an operating button and is expanded by an opposing internal spring. In another micropump developed by the Applicants, a valve, a piston and a casing move into the expansible chamber and with reciprocating and combined movements, open alternately upper and lower ports so as to lead the liquid from a container to an atomizer nozzle.

Among the main advantages of the micropump of the present invention, there can be mentioned the use of a smaller number of components; ball valves are not necessary; it permits full automatization of the production line; reliability of operation is assured through discharge of air entrapped within its chamber during priming; the miniaturization due to the suitable shape of the components; closure is ensured through dual seals and the overcap should not be attached directly to the under-assembled pump and it is also throttling-proof since it only expels liquid under a pressure preset as a design parameter.

The present invention is an improvement over the second version of Applicant's micropump as disclosed above, in which the casing is eliminated and this provides for a significant reduction in cost and in the occurrence of defects. The improvement also enables a modification in the manner through which the chamber is filled or the next cycle, it substantially reduces the dead path (without liquid ejection) of the pump and also decreases the number of operations to obtain the first liquid ejection (priming rate).

One object of the present invention is to provide an improved liquid atomizer micropump mounted on a screw cap or on a rigid drive hood or a semi-rigid fitting hood for attachment to a opening.

A further object of the present invention is to provide an improved liquid atomizer micropump subassembled to a body fastened to a collar which holds a helical spring supported by a valve which seals against a piston forming a variable volume chamber bounded by an upper port and a lower port allowing for reciprocating movement through an actuator button.

During this reciprocating movement, at the rest position, the upper liquid seal/port is closed and the lower liquid seal/port is open and at the beginning of the downward stroke, the lower liquid seal/port is closed by the downward movement of the valve whereupon the cylindrical lower portion seals the lower port with a slight diametrical restriction of the body.

During the downward stroke, the upper liquid seal/port is open when the force generated by the magnitude of the pressure inside the chamber by the working area of the valve becomes greater than the force generated by the bias of the spring so as to allow for a slight movement of the valve in relation to the piston which results in the opening of the upper liquid seal/port, causing the liquid which is under a pressure higher than atmosphere, inside the chamber, to have free access to an atomizer insert and to be ejected into the atmosphere. The ejected liquid is broken by centrifugation and diffusion into very fine particles, which results in a fanlike spray.

According to the invention, the opening of the lower liquid seal/port at the end of the downward stroke is caused by the collision between a projection in the valve near the support of the spring, with the diametrical restriction of the body in order to allow the air coming out with the pump in "dry" condition and balance the pressures of the bottle with the chamber before the upward stroke begins.

According to the invention, the closing of both the upper and lower liquid seal/ports during the upward stroke while the volume inside the chamber increases causing a depression in the chamber until the time when, at the end of the upward stroke, the lower liquid seal/port is open allowing the liquid to be sucked by a tube to the interior of the chamber filling it up so that in the next cycle, the liquid ejection in the downward stroke can be started.

According to the invention, the micropump also comprises an air seal/port which maintains the interior of the bottle at the same pressure as atmosphere, the port being sealed at the rest position and open during operation of the micropump, so as to prevent the bottle from being deformed and the operation of the micropump from being jeopardized.

The improvements brought about in the micropump will be more readily understood with the aid of the illustrative attached drawings and of the following description comprising a preferred embodiment.

Figure 1:
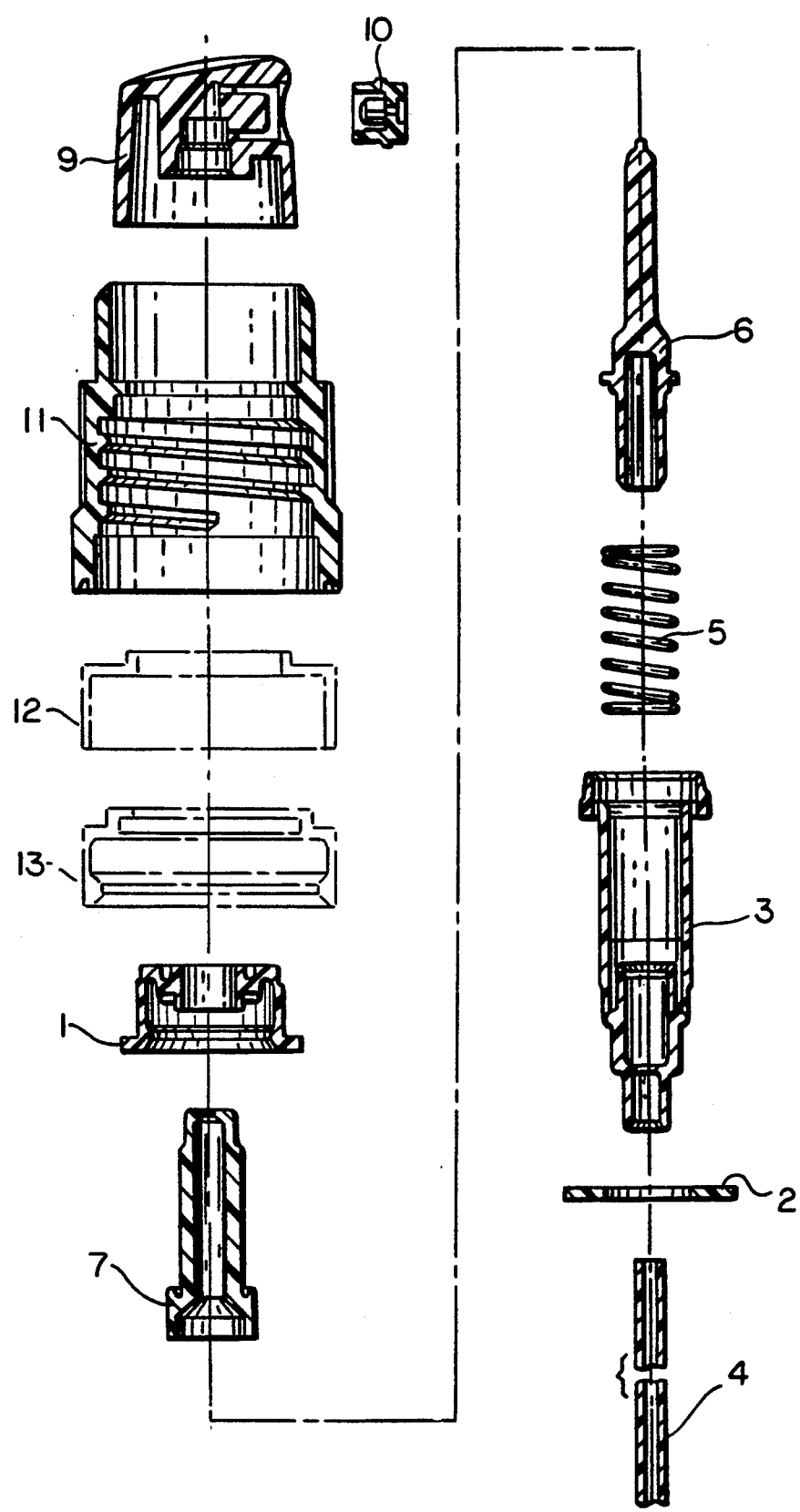
FIG. 1 is an exploded view in longitudinal section of the components of the micropump in the subassembled condition, and showing the various fitting alternatives.

The subassembly of the pump is formed by a collar 1 to be fitted in a screw cap 11 (or alternatively, a rigid drive hood 12 or a semi-rigid fitting hood 13 in accordance with the desirable termination of the bottle containing the liquid to be atomized), a sealing gasket 2 and a cylindrical-shaped body 3 with several diameters, forming a inner skirt and a lower extension, for fitting the suction tube 4 to be immersed into the liquid.

Body 3 is fastened in collar 1 and it houses a helical spring 5 which lower part rests on the internal contour of body 3 itself and which upper part rests on a step in valve 6, formed by a lower cylindrical portion with a support shoulder and a guide for said spring and a stylus-shaped upper portion sealing the upper port "S" in the internal bore of piston 7.

Figure 2:
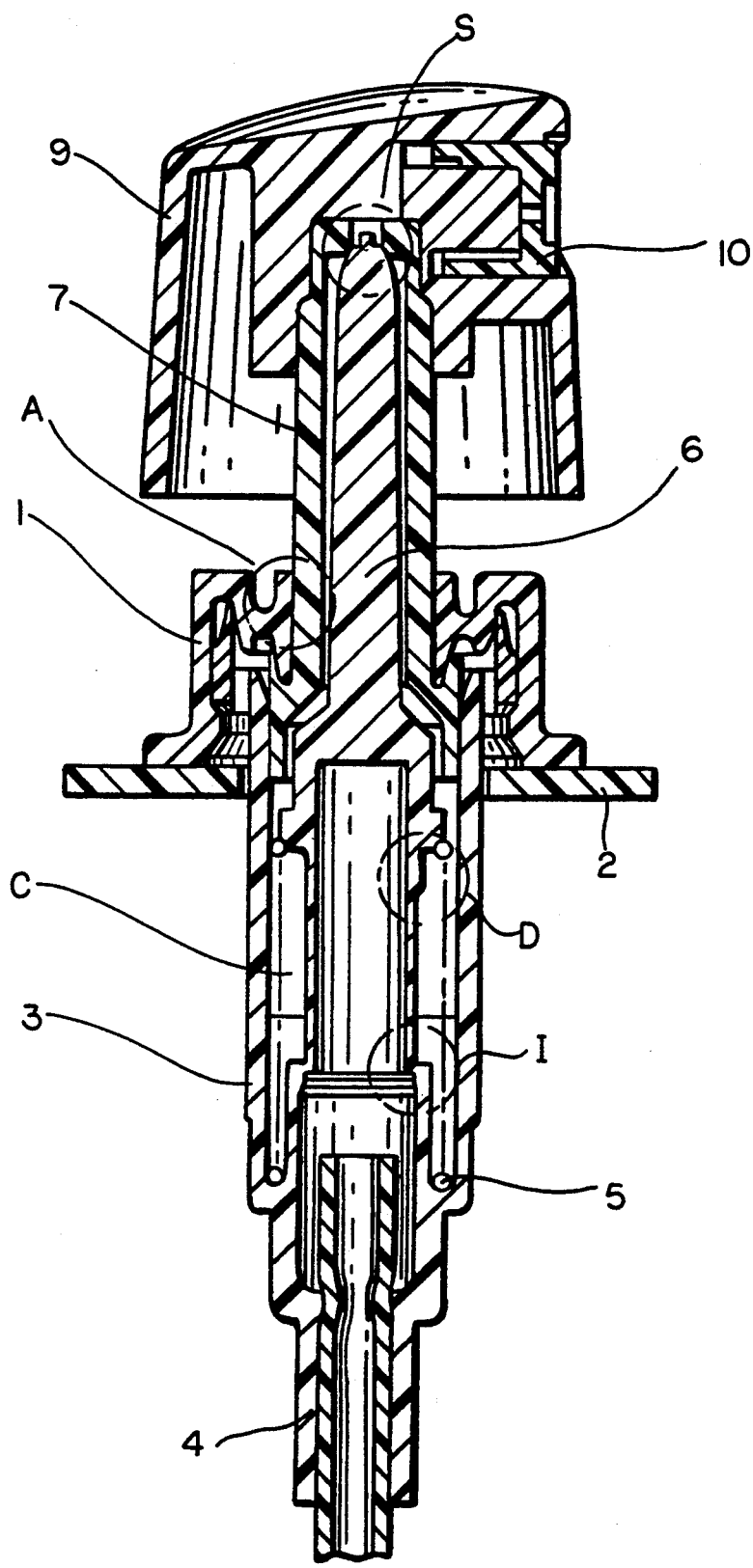
FIG. 2 is a view in longitudinal section of the micropump subassembled in rest condition with the upper "S" port closed and the lower "I" port open.
Figure 3:
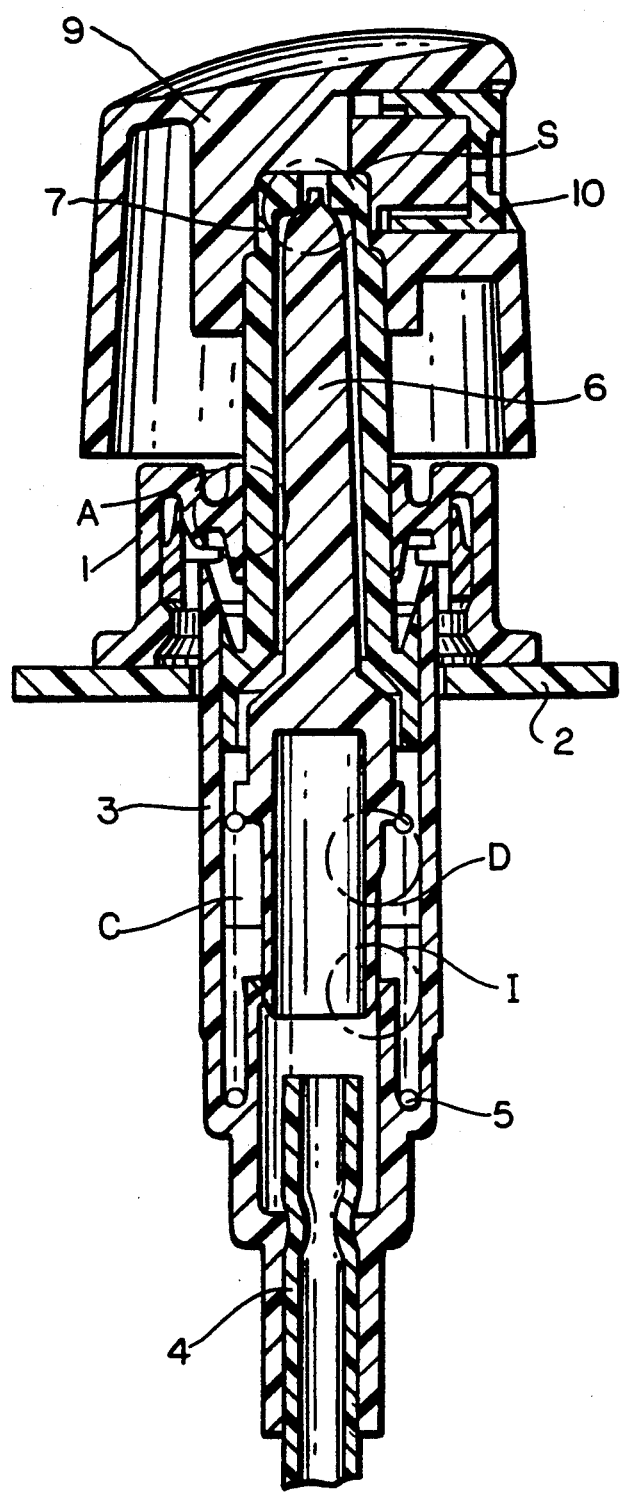
FIG. 3 is a view in longitudinal section of the micropump subassembled at the start position of the downward stroke with the "S" and "I" ports closed.
Figure 4:
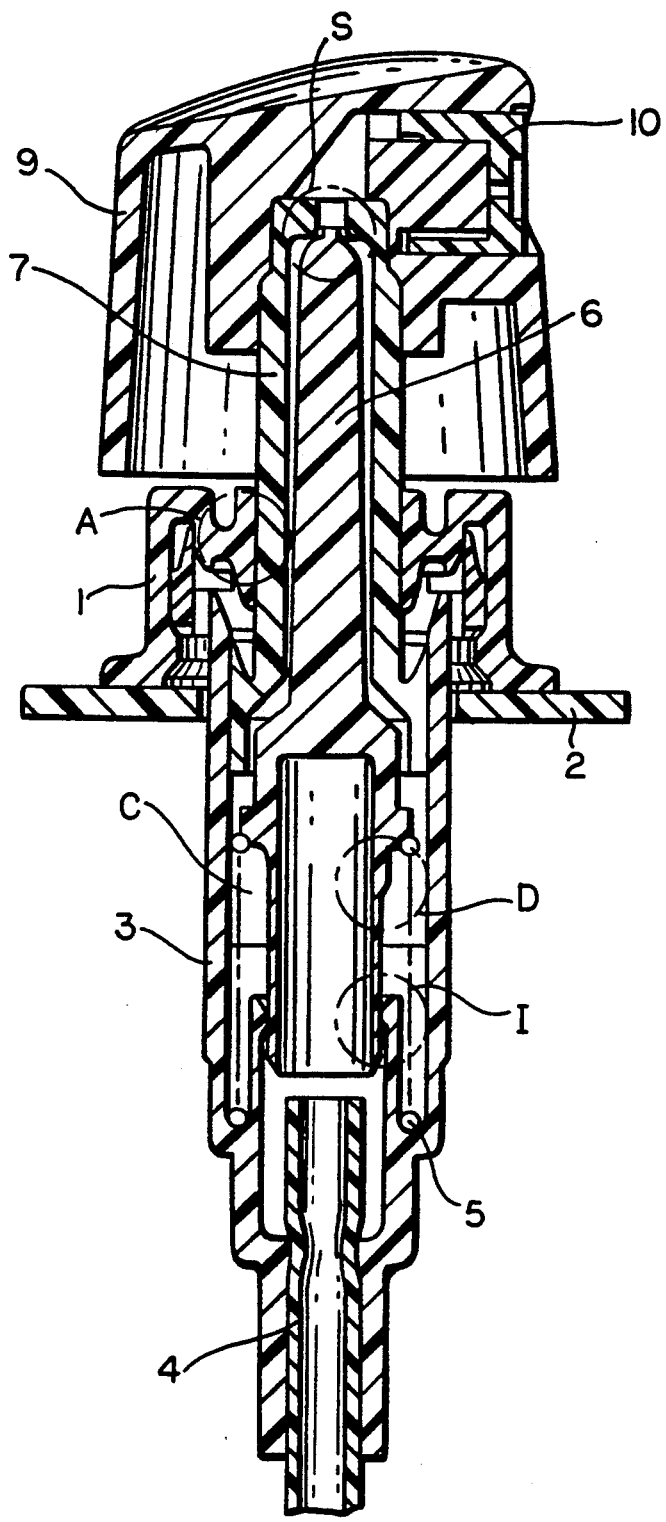
FIG. 4 is a view in longitudinal section of the micropump subassembled at the discharge position of the downward stroke with the "S" port open and "I" port remaining closed.
Figure 5:
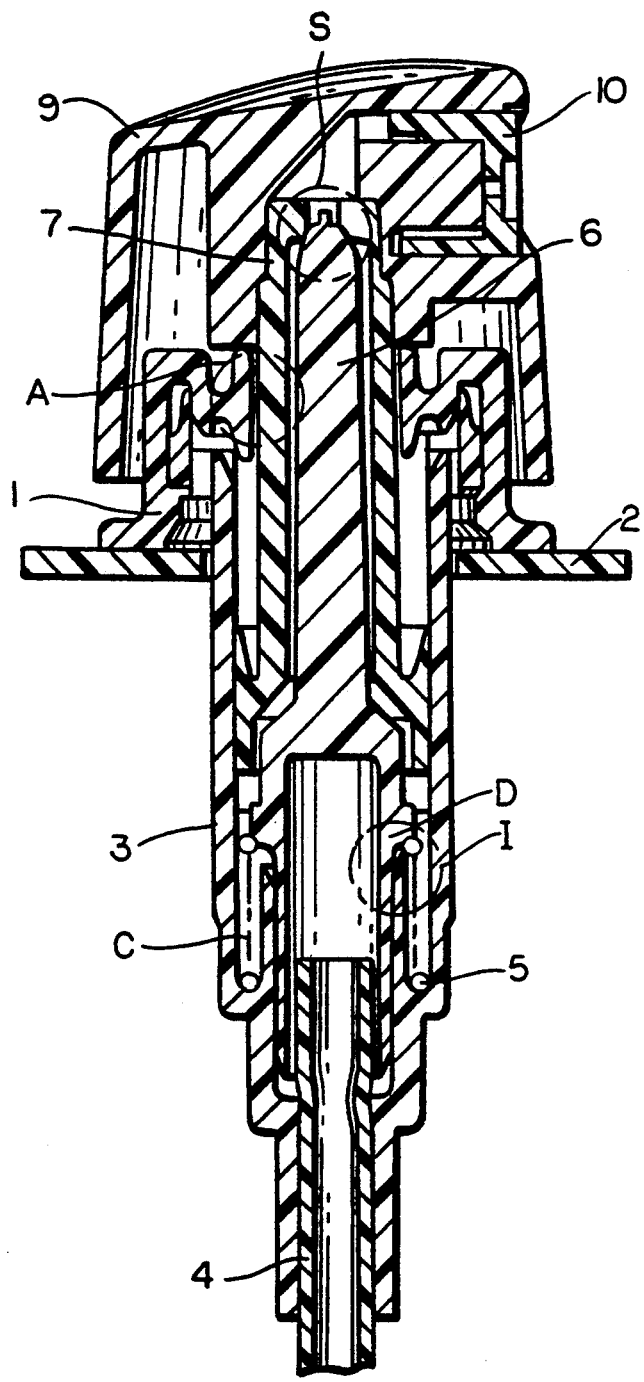
FIG. 5 is a view in longitudinal section of the micropump subassembled at the final position of the stroke with the "S" port closed and "I" port open by the detail "D" of valve 6.

An actuator button 9 having an atomizer insert 10 is secured by being forcibly mounted on the piston 7 rod (see FIGS. 1 and 2). Once the pump is mounted on the bottle by means of a suitable termination 11, 12 or 13 (see FIG. 1), suction tube 4 will be immersed into the liquid.

By pressing button 9, the vertical downward stroke is started. At the beginning of this stroke, the bottom part of valve 6 seals lower port "I" at the slight diametrical restriction of the body 3 skirt. With he downward stroke continuing, the volume of chamber "C" decreases since ports "S" and "I" are closed, causing the pressure in its interior to be raised.

At the end of the downward stroke, a projection "D" in valve 6 collides with the diametrical restriction of body 3, so as to open slightly the lower port "I", permitting air entrapped in chamber "C" to escape to the interior of bottle, thus balancing pressures. When the force upon button 9 ceases, the upward stroke of the pump is started.

During the upward stroke, spring 5 urges valve 5 which, in turn, pushes upwardly the piston assembly 7 and button 9 with insert 10, so as to shut ports "I" and "S", increasing chamber "C" volume and accordingly decreasing the pressure inside this chamber until near the end of the stroke.

At the end of upward stroke of the pump, pressure in chamber "C" is lower than the pressure existing in the bottle, until the lower port "I" is open by the stroke of valve 6, causing suction by tube 4 and displacement of the liquid from the bottle to the interior of chamber "C". This procedure is repeated until chamber "C" is completely full.

Once filling of chamber "C" is complete, at each downward stroke of the pump, pressure in chamber "C" is raised and converted into a downward force upon valve 6 until the force that spring 5 exerts upwardly is overcome shifting valve 6 downwardly, opening upper port "S" and keeping closed lower port "I" thus permitting the liquid under pressure to be ejected through the passages of piston 7 and actuator button 9 and dispersed as droplets by insert 10, until the end of downward stroke. Chamber "C" is again filled with liquid at the end of the upward stroke, when lower port "I" is open, so as to complete a cycle of the micropump.

The feature of opening the upper port "S" is a result of forces on valve 6. That is, when the pressure contained in chamber "C", transformed into downward force by the projected area of valve 6, is greater than the force with which spring 6 pushed valve 6 upwardly, the resultant of downward forces will allow opening of upper port "S" and the discharge liquid under pressure, until pressure in chamber "C" is diminished and such resultant force is rendered null, closing again the upper port "S".

In a single downward stroke of the pump, the upper port "S" will be open whenever the pressure increment in chamber "C" by reduction of its volume, will cause a downward resultant force on valve 6 and will be closed when the force with which the spring 5 pushes valve 6 causes an upward resultant force. Thereby, one can have several openings and closures of the upper port "S" in a single downward stroke or even a single opening throughout this stroke, but this will depend on the way the force is applied over button 9.

Due to the fact that in each cycle, a downward stroke ejects liquid and an upward stroke sucks liquid into the interior of the pump, the volume of liquid contained in the bottle is reduced. In order that this volume reduction will not cause a depression in the interior of the bottle which could deform it or jeopardize pump operation, whenever piston 7 is beneath its rest position, air is permitted to enter between piston 7 and collar 1 through the air seal/port "A" by the opening created between these components at this position.

We claim:

1. A liquid atomizer micropump comprising:
 a) a tube for drawing liquid from a container;
 b) cylindrical-shaped body means for receiving at least an upper portion of said tube and for defining a chamber in which the liquid drawn from the container can be received, said cylindrical-shaped body means comprising an upper cylindrical portion having a first diameter and a lower cylindrical portion having a second diameter which is smaller than the first diameter, said lower cylindrical portion having a skirt at the top thereof;
 c) spray means for receiving fluid from the chamber and expelling it into ambient atmosphere;
 d) a valve moveable in said body means between a plurality of positions for regulating fluid flow between said tube and said chamber, and between said chamber and said spray means; said valve having a bottom which is receivable telescopically in said cylindrical-shaped body means in at least two positions, a first position wherein the valve is received in the body means with the bottom portion of the valve spaced above the skirt of the lower cylindrical portion such that there is an opening between the chamber and the tube which permits fluid communication therebetween, and a second position wherein the bottom portion of the valve is received telescopically in the lower cylindrical portion and blocks the opening between the chamber and the tube so that there can be no fluid communication therebetween;
 e) piston means for urging said valve downward from said first position to said second position, said piston means having an internal bore through which fluid from the chamber must pass to be received in the spray means, said valve having an upper portion which is movable between i) a closed position wherein the upper portion of the valve is received in the bore to prevent fluid communication between the chamber and the spray means, and ii) an open position wherein the upper portion of the valve is spaced from the bore a distance sufficient to allow fluid communication between the chamber and the spray means, and
 f) spring means housed in said cylindrical-shaped body means for applying a force to urge the upper portion of said valve against the internal bore of said piston means, said chamber having a volume which is reduced when the piston means urges the valve downward from said first to said second position, the reduction in volume being capable of creating sufficient fluid pressure within said chamber to overcome the force of the spring and thereby to move said valve from said closed to said open position whereby fluid can pass from the chamber to the spray means and be expelled into ambient atmosphere without the use of a propellant gas.

2. A liquid micropump as claimed in claim 1, wherein said valve contains port means disposed above said bottom portion for cooperating with the skirt of the lower cylindrical portion to define a port through which fluid can pass from the tube to the chamber when the bottom portion of said valve is received telescopically in said lower cylindrical portion in a third position with said port means in contact with the skirt of the lower cylindrical portion, said piston means being capable of urging said valve downward between said first, second and third positions.

3. A liquid micropump as claimed in claim 2, further comprising a collar to which said cylindrical body means is attached, said collar cooperating with the piston means to define an opening into ambient atmosphere when the piston means urges said valve downward into said second or third positions, whereby air can enter between the piston means and collar to prevent collapse of the container.

4. A liquid micropump as claimed in claim 3, further comprising cover means mounted on said collar for attaching the micropump to the container.

5. A liquid micropump as claimed in claim 4, wherein the collar is configured such that the cover means can be selected from any one of a group of covers consisting of a screw cap, a rigid drive hood and a semi-rigid fitting hood.

6. A liquid micropump as claimed in claim 5, wherein the cover means is a cap which screws on the container.

7. A liquid micropump as claimed in claim 2, wherein the micropump has one and only one spring.

* * * * *